FIG. 1.

POLYMERIZATION OF ALLYLSUCROSE AT 100°C.

Patented Nov. 13, 1951

2,574,545

UNITED STATES PATENT OFFICE 2,574,545

PROCESS FOR BREAKING PETROLEUM EMULSIONS

Melvin De Groote, University City, Mo., assignor to Petrolite Corporation, Ltd., Wilmington, Del., a corporation of Delaware Application July 11, 1950, Serial No. 173,049

10 Claims. (Cl. 252—331)

This invention relates to processes or procedures particularly adapted for preventing, breaking or resolving emulsions of the water-in-oil type, and particularly petroleum emulsions.

Complementary to the above aspect of the invention herein disclosed is my companion invention concerned with the new chemical products or compounds used as the demulsifying agents in said aforementioned processes or procedures, as well as the application of such chemical compounds, products, or the like, in various other arts and industries, along with the method for manufacturing said new chemical products or compounds which are of outstanding value in demulsification. See my co-pending application, Serial No. 173,048, filed July 11, 1950.

My invention provides an economical and rapid process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly inorganic salts, from pipeline oil.

Demulsification as contemplated in the present application includes the preventive step of commingling the demulsifier with the aqueous component which would or might subsequently become either phase of the emulsion in the absence of such precautionary measure. Similarly, such demulsifier may be mixed with the hydrocarbon component.

In my co-pending application, Serial No. 173,047, filed July 11, 1950, reference was made to the breaking of petroleum emulsions of the water-in-oil type characterized by subjecting the emulsion to the action of a demulsifier including hydrophile synthetic products; said hydrophile synthetic products being oxyalkylation products of (a) an alpha-beta alkylene oxide selected from the class consisting of ethylene oxide, propylene oxide, butylene oxide, glycide, methylglycide, methyl glycidyl ether, ethyl glycidyl ether and propyl glycidyl ether; and (b) an organic solvent-soluble, oxyalkylation-susceptible polymerization product of a member of the class consisting of allylsucrose, and allylsucrose in combination with other co-polymerizable allyl compounds.

Furthermore, in said aforementioned co-pending application, Serial No. 173,047, filed July 11, 1950, reference was made in a sub-generic phase to a process for breaking petroleum emulsions of the water-in-oil type characterized by subjecting the emulsion to the action of a demulsifier including hydrophile synthetic products; said hydrophile synthetic products being oxyalkylation products of (A) an alpha-beta alkylene oxide selected from the class consisting of ethylene oxide, propylene oxide, butylene oxide, glycide and methylglycide; and (B) an organic solvent-soluble, oxyalkylation-susceptible polymerization product of allylsucrose in which there is present a plurality of hydroxyl radicals; with the proviso that the hydrophile properties of said oxyalkylated derivative in an equal weight of xylene are sufficient to produce an emulsion when said xylene solution is shaken vigorously with one to three volumes of water; and with the final proviso that the molecular weight of the oxyalkylation products on an average statistical basis, assuming completeness of reaction, is in excess of 10,000.

The present invention represent a reduced sub-generic aspect of the previously described aforementioned invention and is in essence an invention within an invention. Briefly stated then, the present invention is concerned with a process for breaking petroleum emulsions of the water-in-oil type characterized by subjecting the emulsion to the action of a demulsifier including hydrophile synthetic products; said hydrophile synthetic products being xylene-soluble; furthermore, said hydrophile synthetic products being oxyalkylation derivatives obtained by reacting (a) polymerized pentaallylsucrose with (b) an alkylene oxide selected from the class consisting of propylene oxide alone and propylene oxide in combination with ethylene oxide, with the proviso that polymerized allylsucrose does not contribute more than 15% of the final weight of the oxyalkylation derivative based on the assumption of completeness of reaction and on an average statistical basis; and with the final proviso that the ultimate composition comes within approximately the trapezoidal area of points A, B, C, D, in the accompanying Figure 2 of the hereto attached drawing.

For convenience, what is said hereinafter is divided into four parts:

Part 1 is concerned with the preparation of allylsucrose;

Part 2 is concerned with the polymerization or blowing of allylsucrose;

Part 3 is concerned with the oxyalkylation of the polymerized or blown allylsucrose; and Part 4 is concerned with the use of oxyalkylated allylsucrose in the resolution or breaking of petroleum emulsions of the water-in-oil type.

PART 1

The preparation of allylsucrose has been described in the literature. See Industrial and Engineering Chemistry, volume 41, p. 1697, August 1949, and Sugar, volume 42, No. 9, p. 28 (1947). It has been described also in a pamphlet distributed by the Sugar Research Foundation, Inc., 52 Wall Street, New York city, N. Y., entitled "Preparation and Properties of Allyl Sucrose."

It is expected that this product will be available commercially within a reasonably short period of time. At the moment, however, pilot plant quantities are available. For convenience, what is said hereinafter is substantially a verbatim quotation from the article in Industrial and Engineering Chemistry, cited above, and in which the authors were Zief and Yanovsky.

"Allyl Chloride Method: Two autoclaves were used. One was glass-lined with iron fittings, the other Monel metal. The amount of allyl chloride (and equivalent amount of alkali) was varied in an attempt to find the optimum ratio of reagents. Table I gives the results.

"Table I.—Preparation of allylsucrose with allyl chloride

| Autoclave | Moles Allyl Chloride/s Moles Sucrose | Analysis of Product | | | Yield Per cent of Theoretical |
|---|---|---|---|---|---|
| | | Allyl Groups | | Hydroxyl groups | |
| | | Direct | From hydroxyl | | |
| Monel | 8 | 4.7 | 5.7 | 2.3 | 70 |
| Do | 10 | 4.8 | 6.1 | 1.9 | 81 |
| Do | 12 | 5.2 | 6.3 | 1.7 | 90 |
| Glass | 12 | 5.8 | 6.1 | 1.9 | 84 |
| Monel | 16 | 5.5 | 6.6 | 1.4 | 90 |

"As with allyl bromide, apparently the optimum amount of allyl chloride is 12 moles per mole of sucrose. Allylsucrose was prepared as follows:

"1. Sucrose (1000 grams, 2.9 moles) was added with mechanical stirring to a mixture of 1402 grams (35.0 moles) of sodium hydroxide and 700 ml. of water at room temperature in a 2-gallon, glass-lined autoclave equipped with a stirrer and a jacket connected to steam and cold water inlets. Allyl chloride (2680 grams, 35.0 moles) was then added, and the autoclave was sealed and heated to 85° C. (jacket temperature). At the beginning of the reaction and up to about 45° to 50° a valve at the top of the autoclave remained open until the vapors of allyl chloride started to condense at the tip of the valve. Heating during the initial stage of the reaction was carefully controlled, since the reaction is exothermic and a rise in temperature above 83° C. darkens the product considerably. Within 1.5 hours the thermometer well temperature was 82° C., and the internal pressure increased rapidly to 20 per square inch. At this point cold water was circulated through the jacket to moderate the reaction. After this exothermic stage was passed, the well temperature was easily controled at 80° to 82° C., for 5.5 hours longer. At the end of 8 hours the well temperature was 81° C., and the pressure was down to about 4 pounds. Heating was discontinued at this point, and the autoclave was allowed to cool. The autoclave was then opened and filled with water, with stirring, to dissolve the sodium chloride. The organic layer was separated, steam-distilled, washed with water and treated as described for the allyl bromide preparation. The yield of light brown oil was 1400 grams (83.5% of theoretical) with a refractive index ($n_D^{20}$) of 1.4920. It contained 5.8 allyl groups and 1.9 hydroxyl groups.

"2. Sucrose (500 grams, 1.5 moles) was added with motor stirring to a mixture of 701 grams (17.5 moles) of sodium hydroxide and 350 ml. of water at room temperature in a 1-gallon, jacketed, Monel metal autoclave. Allyl chloride (1340 grams, 17.5 moles) was added, and the autoclave was sealed and heated to 85° C. (jacket temperature) for 8 hours. Because of the better heat transfer of this autoclave, it was not necessary at any time to cool the jacket to moderate the reaction. Within 1.75 hours the internal pressure reached 25 pounds per square inch, and the well temperature was 82° C. At the end of 8 hours the pressure was down to about 4 pounds and the well temperature was 78° C. The autoclave was then cooled and filled with water to dissolve the sodium chloride, and the product was treated as described above. The yield of light brown oil was 783 grams (90% of theoretical), $n_D^{20}$=1.4960. The number of allyl groups was 5.2; the number of hydroxyl groups, 1.7.

"The allyl content was determined as described previously;[1] the hydroxyl content was determined by the method described by Ogg, Porter, and Willits.[2]

PART 2

In regard to polymerization of allylsucrose reference is made again to the aforementioned Zief and Yanovsky article in Industrial and Engineering Chemistry.

The following table, data, etc., are in substantially verbatim form as they appear therein:

"*Polymerization*

Figure 1:
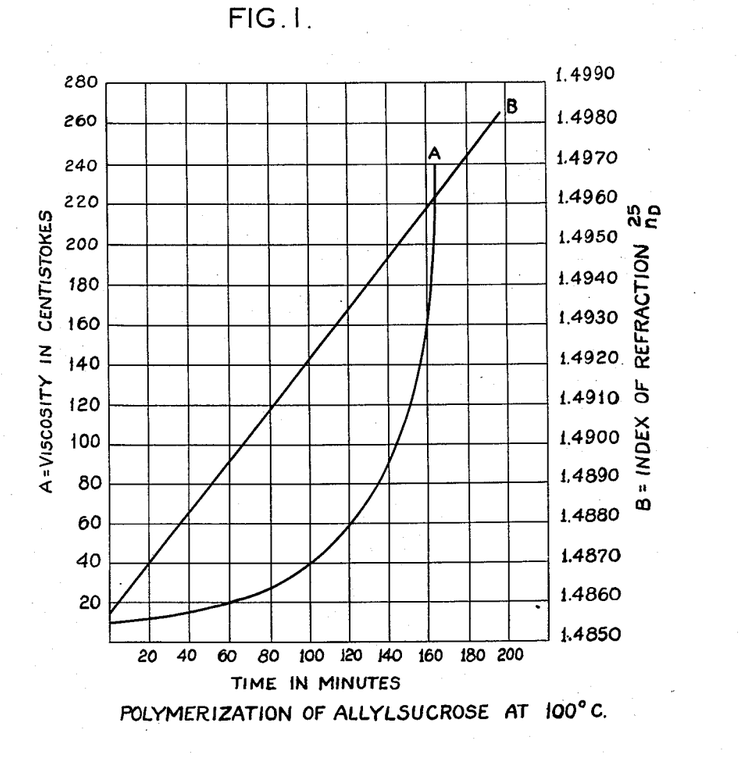

"A previous article[3] pointed out that for some applications—for example, coating materials—it is advisable to oxidize the product partially to increase viscosity. Since, during this partial polymerization, the refractive index increase parallels the increase in viscosity, by observing the change in refractive index and interrupting the oxidation at a standard value, uniform results will be obtained. Figure 1 shows the viscosity and refractive index curves for a laboratory batch of allylsucrose made with allyl bromide. Since laboratory preparations are fairly well standardized with regard to allyl content, viscosity, refractive index, and gelation time, reproducible results were obtained whenever the partial polymerization was interrupted at the same refractive index.

"Allylsucrose prepared in a glass-lined autoclave with allyl chloride has a lower allyl content than the products prepared with allyl bromide and, hence, gives different values for viscosity, refractive index, and gelation time. The viscosity—refractive index curves will, therefore, be somewhat different from those in Figure 1 but will serve the same purpose. The curves for allylsucrose made in a Monel metal autoclave will also be different for, in addition to having a different degree of allylation, the product will be partially polymerized.

"The point at which the preliminary polymerization is stopped is determined by two factors. The closer the refractive index is to the gelation point, the quicker will the film of allylsucrose become tack-free on exposure to air. Thus a 50% solution of allylsucrose in toluene or turpentine (having a refractive index of 1.4940) with 0.1%

---

[1] Nichols, P. L., Jr., and Yanovsky, Elias, J. Am. Chem. So., 67, 46 (1945).
[2] Ogg, C. L., Porter, W. L., and Willits, C. O., Ind. Eng. Chem., Anal. Ed., 17, 394 (1945)."
[3] *Nichols, P. L., Jr., and Yanovsky, Elias, Sugar, 42, No. 9, 28 (1947).*
(Hereto attached Figure 1 corresponds to Figure 1 in the text of the original article.)

of cobalt (as naphthenate or octoate) dried tack-free in 60 to 90 minutes at room temperature. On the other hand, allylsucrose, particularly when partially polymerized, has a tendency to polymerize and eventually gel, even at room temperature. It is important, therefore, to know how long the polymerized substance will be kept before use.

"The effect of storage on monomeric and partially polymerized allyl sucrose was investigated. Allylsucrose (6.7 allyl groups) was polymerized at 100° C. At several points (Figure 1) 25 cc. samples were withdrawn, put into glass vials closed with plastic screw caps, and stored on a laboratory shelf at room temperature (about 25° C.). From time to time the index of refraction of each sample was examined. Table II gives the results.

"Table II shows clearly that, whereas the allylsucrose as prepared (sample 1) scarcely changed during a year of storage, the partially polymerized samples of refractive index 1.4920 or higher gelled at various intervals during this period; the sample of refractive index 1.4911 closely approached the gelation point after 12-month storage. Although sample 7 gelled in about 4 months, 50% solutions tially identical provided, of course, that the peroxide polymerization has not been conducted so as to result in an insoluble compound or mixture. It is hardly necessary to add to what has appeared in the literature in regard to the art of polymerization by blowing of allylsucrose but the following examples are included for illustration and for the reason that cognizance has been taken of the fact that allylsucrose (approximately 5 allyl groups on the average per sucrose molecule) is somewhat dispersible in water, and also somewhat dispersible in the initial stage of polymerization. However, in the latter stage of oxidation or polymerization this is not true as is illustrated by the subsequent examples. These various allyl compounds can be polymerized in the same manner employed to polymerize allyl esters. See U. S. Patent No. 2,374,081, dated April 17, 1945, to Dean.

*Example 1a*

The allylsucrose was blown on a laboratory scale using approximately 1500 grams of allylsucrose in a 3-liter flask. The terminal air inlet was provided with a device which gave a multiplicity of small, fine bubbles. The rate of air was such that there was a continuous stream of "Table II.—*Change in refractive index of allylsucrose during storage*

| Sample No. | Refractive Index, $n_D^{25}$ | | | | | | | |
|---|---|---|---|---|---|---|---|---|
| | At start | 5 weeks | 10 weeks | 18 weeks | 26 weeks | 32 weeks | 43 weeks | 52 weeks |
| 1 | 1.4846 | 1.4847 | 1.4848 | 1.4848 | 1.4849 | 1.4851 | 1.4853 | 1.4857 |
| 2 | 1.4890 | 1.4892 | 1.4899 | 1.4901 | 1.4906 | 1.4909 | 1.4910 | 1.4910 |
| 3 | 1.4900 | 1.4904 | 1.4909 | 1.4913 | 1.4920 | 1.4922 | 1.4928 | 1.4930 |
| 4 | 1.4911 | 1.4913 | 1.4919 | 1.4925 | 1.4931 | 1.4938 | 1.4942 | 1.4944 |
| 5 | 1.4920 | 1.4925 | 1.4930 | 1.4937 | 1.4948 | Gelled | | |
| 6 | 1.4930 | 1.4933 | 1.4940 | Gelled | | | | |
| 7 | 1.4941 | 1.4947 | 1.4948 | Gelled | | | | |
| 8 | 1.4949 | 1.4950 | Gelled | | | | | |
| 50% soln. of No. 7 in Turpentine | 1.4791 | 1.4792 | 1.4793 | 1.4793 | 1.4795 | 1.4798 | 1.4799 | 1.4799 |
| Toluene | 1.4937 | 1.4941 | 1.4940 | 1.4940 | 1.4941 | 1.4946 | 1.4950 | 1.4953 | of the same samples in toluene and turpentine showed no sign of gelation after a year of storage.

The semi-commercial samples of allylsucrose available appear to contain a small amount of volatile aromatic solvent. The actual blowing operation appears to be checked until this bit of aromatic solvent has been blown out. Such allylsucrose can, of course, be blown with or without agitation. Agitation in essence speeds up the polymerization reaction for obvious reasons. It is in essence more vigorous blowing conveniently controlled. In the aforementioned Zief and Yanovsky article referred to in detail above it is, of course, obvious that these investigators were interested perhaps primarily in obtaining a material suitable as a coating. This meant that the blowing operation might well be conducted with a view of preventing darkening and also with a view of obtaining material which was still uniformly soluble in a solvent, such as toluene or xylene. In the instant invention blown or polymerized allylsucrose is nothing more than an intermediate for further reaction. Color or solubility of the kind which might be desirable in a coating is not critical for the instant purpose.

Below are three typical examples in which various degrees of polymerization have been obtained by blowing. Allylsucrose or allylsucroses can be polymerized by peroxides such as benzoyl peroxide, in a conventional manner but the procedure is less satisfactory than air blowing. The final resultant products are probably substanair passing through the reaction mass sufficient to provide at least moderate agitation. The data in the following table do not require explanation:

| Temperature, ° C. | Time, Minutes | Index of Refraction | Water Solubility |
|---|---|---|---|
| 25 | 0 | | Dispersible. |
| 90 | 25 | 1.4883 | Do. |
| 95 | 45 | 1.4887 | Do. |
| 99 | 75 | 1.4880 | Do. |
| 99 | 105 | 1.4882 | Do. |
| 100 | 135 | 1.4885 | Do. |
| 95 | 180 | 1.4895 | Do. |
| 98 | 210 | 1.4892 | Do. |
| 105 | 270 | 1.4900 | Do. |
| 100 | 330 | 1.4900 | Do. |
| 90 | 360 | 1.4907 | Do. |
| 96 | 390 | 1.4915 | Do. |
| 104 | 420 | 1.4922 | Less dispersible. |
| 100 | 440 | 1.4937 | Insoluble. |
| 100 | 460 | 1.4942 | Do. |
| 100 | 480 | 1.4950 | Do. |
| 100 | 490 | 1.4955 | Do. |
| 100 | 510 | 1.4960 | Do. |
| 100 | 540 | 1.4960 | Do. |

In the above experiment the change is refractive index after about 45 minutes of blowing probably meant that all the solvent present had been eliminated. Also, note that when the oxidation stage, which required about 9 hours in all, was about eighty per cent complete the product no longer showed dispersibility comparable to the initial product or the early stages of polymerization. This product was considered as the result of mild blowing, or mild polymerization. See what is said in regard to such characterization in the discussion of the next example.

Example 2a

The same procedure was employed as in Example 1a except that a stirring device was included along with the distributing vent. In this instance the temperature was held at 130° C. for three hours, at the end of which time the product still showed dispersibility. It was then held at 100° for two more hours. At the end of this time the product was not water-soluble and was stringy or even semi-rubbery. When diluted with an equal weight of xylene the dilute solution was still very viscous and somewhat rubbery. The refractive index was 1.4985. Note that this is a higher figure than is shown in the table referred to in the article of Zief and Yanovsky. For purpose of convenience in referring to blown allylsucrose I have used terminology somewhat comparable to that applied in regard to other blown products, such as blown castor oils. I have considered a product which is blown to just short of the rubbery stage and is exemplified by Example 1a, preceding, as mildly oxidized, mildly blown, or mildly polymerized. I have used the expression "drastic polymerization" to indicate a product which is not only stringy or rubbery as such but also is highly viscous and shows stringiness or rubberiness in a 50% xylene solution or as a solution in other suitable solvents. Such stage is typified by the present example, i. e., Example 2a.

I have used the expression "semi-drastically blown," or "semi-drastically polymerized," to indicate a product which shows incipient stringiness as such but where such stringiness disappears on dilution. Such product is illustrated by the next example.

Example 3a

The same procedure was employed in every respect as in Example 2a except that the second stage of oxidation at 100° C. was permitted to take place for 1½ hours only instead of 2 hours, and the refractive index at the end of this time was 1.4980. The product showed a definite tendency to string or rubberize but this property practically disappeared when a 50% solution in xylene was prepared.

Actually blowing or polymerizing can be conducted with ozone or ozonized air as well as air which may or may not have its moisture content eliminated. In this particular type of reaction I have found no advantage in going to any added cost in regard to the oxygenating procedure which initiates polymerization. In the polymerization of compounds in which basic amino radicals are present I prefer to use air which has been stripped of carbon dioxide by means of soda lime or any other convenient means.

The same is true of a catalyst, such as lead, manganese or cobalt naphthenate or the like as has been described in the literature previously mentioned. Such catalyst in comparatively small amounts, one-tenth per cent or preferably less, will speed up the polymerization but here again I have not found this particularly desirable. Since it is usually intended to stop the polymerization at some particular point by use of a mild blowing or a semi-drastic blowing, or a drastic blowing, it is of greater convenience to approach the end point slowly rather than rapidly, and also to have polymerization cease when the air stream stops.

Referring again to the development of allylsucrose, as has been pointed out, one of the objectives appears to be concerned with a suitable coating material. Everything else being equal presumably the fewer hydroxyl radicals available in the coating material the better. On the other hand as an intermediate reactant this need not apply. Sucrose as an initial raw material has 8 hydroxyl radicals. Diallylsucrose, of course, would have an excess of hydroxyl radicals over allyl radicals and would not possibly be particularly suitable for a coating material. This does not apply to its use as an intermediate as herein described. The same would be true of tri-allylsucrose or tetra-allylsucrose. The product now available in at least pilot plant quantities and perhaps shortly in commercial quantities appears to be largely the penta-allylsucrose with some tetra-allylsucrose, and possibly some hexa-allylsucrose present, with perhaps minor amounts or almost insignificant amounts of other allylsucroses. Tetra-allylsucrose, in which the allyl radicals and the hydroxyl radicals are equal, is a particularly suitable reactant. In penta-allylsucrose and hexa-allylsucrose there are more allyl radicals than hydroxyl radicals. The effect of this variation in the molecule is significant, particularly insofar that it affects the molecular weight of the ultimate oxyalkylated product described subsequently in at least two ways: (a) The more hydroxyl radicals the more long ether chains which can be added per molecule. (b) On the other hand the more allyl radicals probably the larger the polymerized molecule although this may not be true. It may be better to assume the more allyl radicals the more readily the product can be blown or polymerized. Excessive polymerization eliminates solvent solubility. The product resulting from polymerization must meet this solubility test, and must also be susceptible to oxyalkylation in absence of a solvent and particularly oxyalkylation in presence of a solvent.

There is a fairly narrow range where the product if given "super-drastic" treatment is only partially soluble at the most in xylene or the like but is still soluble, at least sufficient for the purpose, in a semi-polar solvent such as dioxane, ethylene glycol diethyl ether, diethylene glycol diethyl ether and tetraethylene glycol dimethyl ether.

Other solvents include hydrogenated aromatic materials such as tetralin and decalin, and ethers containing an aromatic radical such as p-tert-amylphenyl methyl ether, p-tert-amylphenyl n-butyl ether, n-butyl phenyl ether, or more highly oxygenated solvents obtained by treating benzyl alcohol or phenol or alkylated phenol with 1, 2 or 3 moles of an alkylene oxide, such as ethylene oxide or propylene oxide, followed by methylation so as to convert the terminal oxygen-linked hydrogen atom into a methyl radical.

Stringiness or rubberiness as described above is probably an indication of incipient cross-linking or gelation. In any event the allylsucroses and particularly those having a plurality of allyl groups as differentiated from monallylsucrose, can be divided into three classes: (1) Those in which there are more hydroxyl radicals than allyl radicals, with (2) the number of hydroxyl radicals and allyl radicals approximately equal, and (3) where the number of allyl radicals are greater than hydroxyl radicals. As previously stated, the commercial product or semi-pilot plant product now available is on a statistical basis approximately penta-allylsucrose and in actual composition represents primarily penta-allylsucrose with some hexa, some tetra, and perhaps other allyl compounds present.

Incipient polymerization means dimerization and trimerization. It is probable that in the procedure above described that higher polymers such as tetramers, pentamers, etc., are formed to a greater or lesser degree. However, at some subsequent stage as soon as more than incipient cross-linking takes place the polymers are no longer soluble in xylene or in some of the semipolar solvents described, or in a mixture of the two. It is to be noted that the solvents of the semi-polar type are characterized by the fact that they may be present in the subsequent oxyalkylation step and are not susceptible to oxyalkylation. It is to be noted also that in the subsequent description of the oxyalkylation step (Part 3) it becomes obvious that with a tetramer or pentamer and probably even in the case of a trimer, one may readily obtain derivatives in which the molecular weights are in the neighborhood of 100,000 or thereabouts.

PART 3

Numerous derivatives of the kind described in Part 2, preceding, have been prepared on a scale varying from a few hundred grams on a laboratory scale to larger amounts. This applies also to the preparation of oxyalkylated compounds of the kind or type comparable to those with which this third part of the text is concerned. In preparing a large number of examples I have found it particularly advantageous to use laboratory equipment which permits continuous oxypropylation and oxyethylation. The alkylene oxides used are ethylene oxide and propylene oxide with the proviso that propylene oxide may be used alone but ethylene oxide is used only in conjunction with propylene oxide in a combination in which ethylene oxide contributes a minor proportion. What immediately follows refers to oxyethylation and it is understood that oxypropylation can be handled conveniently in exactly the same manner.

The oxyethylation procedure employed in the preparation of derivatives of the preceding intermediates has been uniformly the same, particularly in light of the fact that a continuous operating procedure was employed. In this particular procedure the autoclave was a conventional autoclave, made of stainless steel and having a capacity of approximately one gallon, and a working pressure of 1,000 pounds gauge pressure. The autoclave was equipped with the conventional devices and openings, such as the variable stirrer operating at speeds from 50 R. P. M. to 500 R. P. M., thermometer well and thermocouple for mechanical thermometer; emptying outlet; pressure gauge, manual vent line; charge hole for initial reactants; at least one connection for conducting the incoming alkylene oxide, such as ethylene oxide, to the bottom of the autoclave; along with suitable devices for both cooling and heating the autoclave, such as a cooling jacket and, preferably, coils in addition thereto, with the jackets so arranged that it is suitable for heating with steam or cooling with water, and further equipped with electrical heating devices. Such autoclaves are, of course, in essence small scale replicas of the usual conventional autoclave used in oxyalkylation procedures.

Continuous operation, or substantially continuous operation, is achieved by the use of a separate container to hold the alkylene oxide being employed, particularly ethylene oxide. The container consists essentially of a laboratory bomb having a capacity of about one-half gallon, or somewhat in excess thereof. This bomb was equipped, also, with an inlet for charging, and an outlet tube going to the bottom of the container so as to permit discharging of alkylene oxide in the liquid phase to the autoclave. Other conventional equipment consists, of course, of the rupture disc, pressure gauge, sight feed glass, thermometer connection for nitrogen for pressuring bomb, etc. The bomb was placed on a scale during use and the connections between the bomb and the autoclave were flexible stainless hose or tubing so that continuous weighings could be made without breaking or making any connections. This also applied to the nitrogen line, which was used to pressure the bomb reservoir. To the extent that it was required, any other usual conventional procedure or addition which provided greater safety was used, of course, such as safety glass, protective screens, etc.

With this particular arrangement practically all oxyethylations become uniform in that the reaction temperature could be held within a few degrees of any selected point in this particular range. In the early stages where the concentration of catalyst is high the temperature was generally set for around 150° C. or thereabouts. Subsequently temperatures up to 170° C. or higher may be required. It will be noted by examination of subsequent examples that this temperature range was satisfactory. In any case, where the reaction goes more slowly a higher temperature may be used, for instance, 165° C. to 180° C., and if need be 185° C. to 190° C. Incidentally, oxypropylation takes place more slowly than oxyethylation as a rule and for this reason we have used a temperature of approximately 160° C. to 165° C., as being particularly desirable for initial oxypropylation, and have stayed within the range of 165° C. to 185° C., almost invariably during oxypropylation. The ethylene oxide was forced in by means of nitrogen pressure as rapidly as it was absorbed as indicated by the pressure gauge on the autoclave. In case the reaction slowed up the temperature was raised so as to speed up the reaction somewhat by use of extreme heat. If need be, cooling water was employed to control the temperature.

As previously pointed out in the case of oxypropylation as differentiated from oxyethylation, there was a tendency for the reaction to slow up as the temperature dropped much below the selected point of reaction, for instance, 170° C. In this instance the technique employed was the same as before, that is, either cooling water was cut down or steam was employed, or the addition of propylene oxide speeded up, or electric heat used in addition to the steam in order that the reaction proceeded at, or near, the selected temperatures to be maintained.

Inversely, if the reaction proceeded too fast regardless of the particular alkylene oxide, the amount of reactant being added, such as ethylene oxide, was cut down or electrical heat was cut off, or steam was reduced, or if need be, cooling water was run through both the jacket and the cooling coil. All these operations, of course, are dependent on the required number of conventional gauges, check valves, etc., and the entire equipment, as has been pointed out, is conventional and, as far as we are aware, can be furnished by at least two firms who specialize in the manufacture of this kind of equipment.

The use of ethylene oxide and propylene oxide represents a distinct hazard. See article entitled "Ethylene Oxide Hazards and Methods of Handling," Industrial and Engineering Chemistry, volume 42, No. 6, June 1950, pp. 1251-1258.

Figure 2:
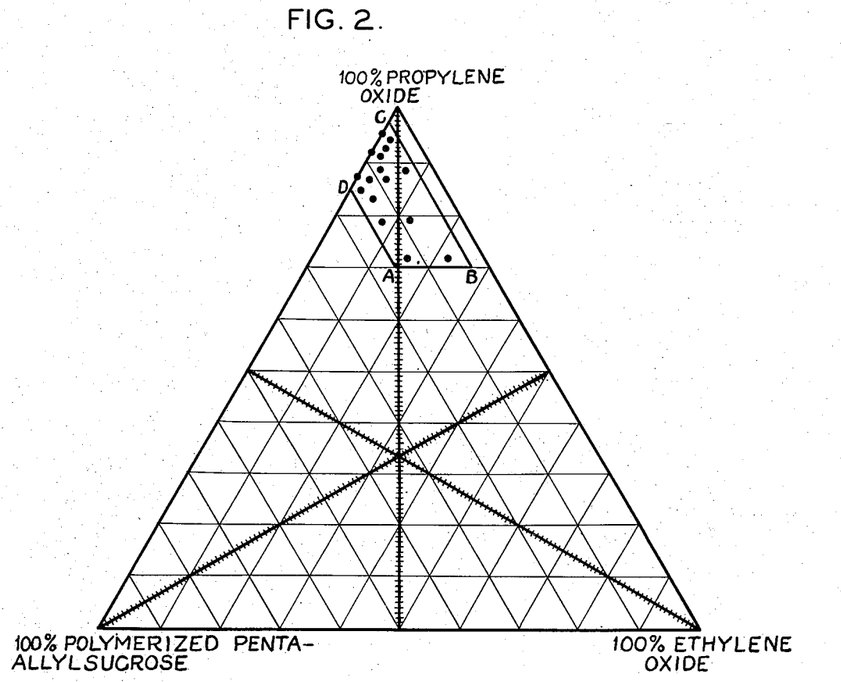

Reference is made to the hereto appended drawing in which the tetrahedron defined by points A, B, C, D, of Fig. 2 show the composition of materials obtained from polymerized pentaallylsucrose and propylene oxide alone, or propylene oxide in combination with ethylene oxide. This triangular graph is, of course, conventional and the percentage composition can be read directly from the graph. However, for purpose of convenience the following table (Table I) is presented. In this table the four points which define the tetrahedron, to wit, A, B, C, D, are so marked. The three points on the line which show a binary mixture of polymerized pentaallylsucrose and propylene oxide only are described as I, II and III in Roman numerals. These correspond to the three points in order of increasing propylene oxide content. All the remaining points numbered 1 to 13, inclusive, correspond to the points within the area following in a general clockwise direction, beginning near the top. An effort to number all these points would only cause a confused presentation and would detract from clarity. All these data are incorporated in the following table:

Table I

| | Percentages by Weight | | |
|---|---|---|---|
| | Per Cent Polymerized Pentaallylsucrose | Per Cent Propylene Oxide | Per Cent Ethylene Oxide |
| A | 15 | 70 | 15 |
| B | 3 | 70 | 27 |
| C | 3 | 97 | 0 |
| D | 15 | 85 | 0 |
| I | 13 | 87 | 0 |
| II | 8 | 92 | 0 |
| III | 5 | 95 | 0 |
| 1 | 4.5 | 94.0 | 1.5 |
| 2 | 6.5 | 92.0 | 1.5 |
| 3 | 7.5 | 91.0 | 1.5 |
| 4 | 4.5 | 88.5 | 7.0 |
| 5 | 8.5 | 86.5 | 5.0 |
| 6 | 14.0 | 85.5 | 1.5 |
| 7 | 13.0 | 82.5 | 4.5 |
| 8 | 8.0 | 79.0 | 13.0 |
| 9 | 12.5 | 71.5 | 16.0 |
| 10 | 6.0 | 72.0 | 22.0 |
| 11 | 14.0 | 79.0 | 7.0 |
| 12 | 12.0 | 86.0 | 2.0 |
| 13 | 8.5 | 89.0 | 2.5 |

In regard to the compounds obtained from polymerized pentaallylsucrose and propylene oxide alone there is, of course, no variation possible in the sense that this is true in regard to the use of combined oxides. Where both ethylene oxide and propylene oxide are used three or more variations are possible; one can react with propylene oxide first and then with ethylene oxide; or react with ethylene oxide first and then with propylene oxide; or simply mix the two oxides and use a single oxyalkylation procedure so as to get random oxyalkylation. My preference is to oxypropylate first and then use ethylene oxide.

Example 1b

|  | Grams |
|---|---|
| Polymerized pentaallylsucrose, identified as Example 1a, preceding | 150 |
| Xylene | 500 |
| Sodium methylate | 10 |

The above mixture was placed in an autoclave and an adjustment made so the temperature would vary between 160° C. and 180° C. The pressure control was set so the pressure would not go above 190 pounds per square inch during the operation. The time period regulator was set so as to inject the propylene oxide in three hours and then continue stirring for a half-hour longer. The reaction went readily and, as a matter of fact, the propylene oxide could have been injected in less than an hour's time and the reaction would have been completed without allowing for a subsequent stirring period.

The above operation was typical insofar that this entire series of oxypropylations were conducted as a rule within the temperature range of 145° to 190° C. The pressure varied from 130 pounds to 180 pounds per square inch. The entire time period varied from approximately 2 hours to 3½ hours. The catalyst used was sodium methylate although caustic soda or caustic potash would be just as satisfactory. The solvent used was xylene, although any other suitable solvent such as cymene or decalin could have been used. The use of the solvent is largely a matter of convenience. For instance, in an autoclave whose volume capacity is approximately 3½ liters it is usually necessary to have a minimum of 300 to 500 grams in the autoclave so as to have satisfactory regulations by mechanical devices during the early stages of reaction. The solvent, of course, can be removed subsequently, if desired, by distillation, particularly vacuum distillation. The autoclave was operated at a speed of about 350 R. P. M. Actually, a somewhat lower temperature could have been used but temperatures such as described in subsequent Table 3 eliminate any possibility of unreacted alkylene oxide being left over at the end of the reaction. The time period arrangement was just purely a matter of convenience generally speaking, and a half-hour stirring period was allowed after the reaction was complete simply as a safeguard and, in addition, a regulator was set to inject the oxide in half the allotted time for the reason that if the automatic regulator stopped the reaction for fifty per cent of the time there would still be ample time to insure complete introduction of oxide.

In subsequent Tables 2 and 3 there are data in regard to the preparation of oxyalkylated derivatives in the same manner as described in Example 1b, preceding. In these Examples 6b through 20b, the propylene oxide was added first as indicated.

In numerous cases the amount of ethylene oxide added was comparatively small as in Examples 6b through 12b and 18b through 20b. In these examples the reaction mass was allowed to cool, the autoclave opened, and the ethylene oxide added, the autoclave swept free with nitrogen, and then sealed, and oxyethylation permitted to take place under substantially the same conditions as before. In some instances part of the solvent was added at the initial propylene oxide stage and some at the ethylene oxide stage. In some instances all the catalyst was added at the propylene oxide stage and in other instances part at the propylene oxide stage and part at the ethylene oxide stage. All this is shown clearly in Table 3. In such instances where the amount of ethylene oxide added was sizeable, for instance, in Examples 13b through 17b, the automatic injector device was employed although this was unnecessary. All the oxide could have been added in a single portion, all at one time.

A second series of oxyethylations were conducted in the same manner as in Examples 6b through 20b, with this difference; the ethylene oxide was added first and then the propylene oxide was added. Here, again, in the counterpart of Examples 6b through 12b and 18b through 20b the oxyethylations were conducted by simply injecting the oxide in a single batch and permitting reaction to take place. In these instances all the solvent and all the catalyst was added at the initial reaction stage. The reactions in all instances took place rather rapidly, comparable to the conditions indicated in regard to ethylene oxide in Table 3, i. e., temperature ranges of 140° C. to 160° C., and the pressure ranges were sometimes as low as 80, 90 or 100 pounds per square inch, up to 160 pounds. The time allowed for reaction was from one hour to two hours with one-half hour for stirring. Actually, in most instances the reaction was complete within a few minutes and even where the oxide was injected in fifteen minutes, as in the counterparts of Examples 13b or 14b, the reaction was complete in less than 45 minutes.

A third series of oxyalkylations were conducted in the same manner as preceding, except that the ethylene oxide and propylene oxide were mixed together and random oxyalkylation permitted to take place. The amount of reactants used were as used in Tables 1 and 2; the amount of catalyst used represents the total amount in each instance; and the amount of solvent used represents the total amount in each instance. The oxyalkylation temperature was that indicated for propylene oxide only in Table 3 for the reason that this was more than sufficient and the use of ethylene oxide actually did not markedly increase the actual reaction time. In most instances reaction time is a matter of convenience, i. e., after the apparatus was started it was permitted to run roughly the bulk of half a working day because this fitted into convenience of operation.

A variety of additional derivatives were prepared simply substituting polymerized pentaallylsucrose identified as Example 2a or 3a, preceding, in the same three series as those employing polymerized pentaallylsucrose in Example 1a. As pointed out previously my preference is, everything else being equal, to add the propylene oxide first and then the ethylene oxide where both oxides are employed.

In the various calculations in the table the amount of catalyst is shown but is not taken into consideration in calculating composition, for the reason that the catalyst can be eliminated readily by adding a suitable acid, such as HCl, refluxing the mixture with a conventional phase-separating trap so the xylene eliminates the water, cooling and applying filtration so as to eliminate the sodium chloride or other salt formed. For many uses, such as demulsification, the residual catalyst may remain in the mixture.

*Table 2*

| Ex. No. | PPAS or Other Starting Material [1] | Grs. | Xylene Grs. | PrO Grs. | EtO Grs. | Per cent by weight Solvent-free | | | Per Cent Solvent-Containing | | | |
|---|---|---|---|---|---|---|---|---|---|---|---|---|
| | | | | | | PPAS | PrO | EtO | PPAS | PrO | EtO | Solvent |
| 1b | 1a | 150 | 500 | 850 | --- | 15 | 85 | ---- | 10 | 56.7 | ---- | 33.3 |
| 2b | 2b | 1000 | 500 | 152 | --- | 13 | 87 | ---- | 9.1 | 60.7 | ---- | 30.2 |
| 3b | 1b | 1000 | 500 | 875 | --- | 8 | 92 | ---- | 6.3 | 72.4 | ---- | 21.3 |
| 4b | 3b | 938 | 250 | 562 | --- | 5 | 95 | ---- | 4.3 | 81.2 | ---- | 14.5 |
| 5b | 3b | 750 | 125 | 500 | --- | 3 | 97 | ---- | 3.7 | 83.7 | ---- | 12.6 |
| 6b | 1a | 45 | 250 | 940 | 15 | 4.5 | 94 | 1.5 | 3.6 | 75.2 | 1.2 | 20 |
| 7b | 1a | 65 | 250 | 920 | 15 | 6.5 | 92 | 1.5 | 5.2 | 73.6 | 1.2 | 20 |
| 8b | 1a | 75 | 250 | 910 | 15 | 7.5 | 91 | 1.5 | 6.0 | 72.8 | 1.2 | 20 |
| 9b | 1a | 45 | 250 | 885 | 70 | 4.5 | 88.5 | 7.0 | 3.6 | 70.8 | 5.6 | 20 |
| 10b | 1a | 85 | 250 | 865 | 50 | 8.5 | 86.5 | 5.0 | 6.8 | 69.2 | 4.0 | 20 |
| 11b | 1a | 140 | 250 | 855 | 15 | 14.0 | 85.5 | 1.5 | 11.2 | 68.6 | 1.2 | 20 |
| 12b | 1a | 130 | 250 | 825 | 45 | 13.0 | 82.5 | 4.5 | 10.4 | 66.0 | 3.6 | 20 |
| 13b | 1a | 150 | 250 | 700 | 150 | 15.0 | 70.0 | 15.0 | 12.0 | 56.0 | 12.0 | 20 |
| 14b | 1a | 30 | 250 | 700 | 270 | 3.0 | 70.0 | 27.0 | 2.4 | 56.0 | 21.6 | 20 |
| 15b | 1a | 80 | 250 | 790 | 130 | 8.0 | 79.0 | 13.0 | 6.4 | 63.2 | 10.4 | 20 |
| 16b | 1a | 125 | 250 | 715 | 160 | 12.5 | 71.5 | 16.0 | 10.0 | 57.2 | 12.8 | 20 |
| 17b | 1a | 60 | 250 | 720 | 220 | 6.0 | 72.0 | 22.0 | 4.8 | 57.6 | 17.6 | 20 |
| 18b | 1a | 140 | 250 | 790 | 70 | 14.0 | 79.0 | 7.0 | 11.2 | 63.2 | 5.6 | 20 |
| 19b | 1a | 120 | 250 | 860 | 20 | 12.0 | 86.0 | 2.0 | 9.6 | 68.8 | 1.6 | 20 |
| 20b | 1a | 85 | 250 | 890 | 25 | 8.5 | 89.0 | 2.5 | 6.8 | 71.2 | 2.0 | 20 |

[1] All items are on solvent-free basis as noted in grams in next column.

*Table 3*

| Ex. No. | Added First | Catalyst Na Methylate, Grs. | Solvent, Grs. | Max. Temp., °C. | Max. Pres., Lbs. sq. in. | Time, Hrs. | Catalyst Na Methylate | Solvent, Grs. | Max. Temp., °C. | Max. Pres., Lbs. sq. in. | Time, Hrs. |
|---|---|---|---|---|---|---|---|---|---|---|---|
| 1b | -------- | 10 | 500 | 180 | 170 | 2½ | -------- | -------- | -------- | -------- | -------- |
| 2b | -------- | 12 | 500 | 165 | 160 | 2½ | -------- | -------- | -------- | -------- | -------- |
| 3b | -------- | 15 | 500 | 170 | 185 | 3½ | -------- | -------- | -------- | -------- | -------- |
| 4b | -------- | 15 | 500 | 185 | 150 | 3½ | -------- | -------- | -------- | -------- | -------- |
| 5b | -------- | 8 | 500 | 190 | 155 | 3½ | -------- | -------- | -------- | -------- | -------- |
| 6b | Pro | 8 | 250 | 170 | 150 | 2½ | -------- | -------- | 150 | 130 | 1 |
| 7b | Pro | 9 | 250 | 175 | 170 | 2½ | -------- | -------- | 150 | 100 | 1 |
| 8b | Pro | 10 | 250 | 165 | 165 | 2½ | -------- | -------- | 155 | 80 | 1 |
| 9b | Pro | 8 | 250 | 155 | 180 | 3 | -------- | -------- | 145 | 90 | 1 |
| 10b | Pro | 9 | 250 | 145 | 160 | 3 | -------- | -------- | 160 | 110 | 1 |
| 11b | Pro | 0 | 250 | 170 | 140 | 2½ | -------- | -------- | 150 | 120 | 1 |
| 12b | Pro | 10 | 250 | 180 | 150 | 3½ | -------- | -------- | 140 | 130 | 1 |
| 13b | Pro | 8 | 225 | 165 | 180 | 3½ | 2 | 25 | 150 | 135 | 1½ |
| 14b | Pro | 7 | 200 | 170 | 170 | 3½ | 1 | 50 | 150 | 150 | 1½ |
| 15b | Pro | 8 | 200 | 155 | 150 | 2½ | 1 | 50 | 145 | 110 | 1½ |
| 16b | Pro | 7 | 225 | 155 | 160 | 3 | 2 | 25 | 150 | 125 | 1½ |
| 17b | Pro | 7 | 200 | 150 | 165 | 3 | 2 | 50 | 160 | 150 | 2 |
| 18b | Pro | 8 | 225 | 145 | 135 | 2½ | 1 | 25 | 155 | 145 | 1 |
| 19b | Pro | 10 | 250 | 160 | 130 | 2½ | -------- | -------- | 140 | 135 | 1 |
| 20b | Pro | 10 | 250 | 170 | 155 | 3 | -------- | -------- | 145 | 160 | 1 |

The oxyalkylated products obtained in the manner previously described vary in color from a very pale straw color to a somewhat darker shade. The color is due primarily to the polymerized pentaallylsucrose which, of course, lightens in color as oxyalkylation takes place. Sometimes color seems to be related to a trace of some impurity or trace of air that gets in the apparatus, or perhaps due to a trace of metal in the reaction vessel itself. Such color can be eliminated in the usual manner, such as filtering through charcoal, filter earth, or the like. The solvent can be eliminated in the manner previously described, the alkaline catalyst can be eliminated in the manner previously described or by solution in water and treatment with an ion exchange resin. For most purposes, and particularly for demulsification, color is immaterial, trace of alkaline catalyst is immaterial, and the presence of a solvent is immaterial. The purified materials ordinarily have the viscosity and appearance of glycols, such as liquid polyethylene glycol or the polypropylene glycols.

As previously pointed out these products are valuable for other purposes than demulsification. For instance, they can be used as intermediates for the preparation of valuable derivatives as described in my co-pending application, Serial No. 173,050, filed July 11, 1950. They can be used as break inducers in the doctor treatment of sour hydrocarbons; they can be used as additives in nonhydrocarbon lubricating oils to give increased lubricity; they can be used as additives in emulsion systems to give more stable emulsions, etc.

PART 4

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000 or 1 to 30,000, or even 1 to 40,000, or 1 to 50,000 as in desalting practice, such an apparent insolubility in oil and water is not significant because said reagents undoubtedly have solubility within such concentrations. This same fact is true in regard to the material or materials employed as the demulsifying agent of my process.

In practicing my process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and re-introduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the undesirable water content of the emulsion separates and settles from the mass.

The following is a typical installation.

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels to 2000 barrels capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances the oxyalkylated products herein specified as demulsifiers can be conveniently used without dilution. However, as previously noted, they may be diluted as desired with any suitable solvent. For instance, an excellent demulsifier can be obtained by mixing 75 parts by weight of oxyalkylated polymerized allylsucrose identified as Example 6b, preceding, with 15 parts by weight of xylene and 10 parts by weight of isopropyl alcohol.

As noted above the products herein described may be used not only in diluted form but also may be used admixed with some other chemical demulsifier, for instance, a mixture comprising the following:

Oxyalkylated derivative, for example the product of Example 6b, 20%;

A cyclohexylamine salt of a polypropylated naphthalene monosulfonic acid, 24%;

An ammonium salt of a polypropylated naphthalene monosulfonic acid, 24%;

A sodium salt of oil-soluble mahogany petroleum sulfonic acid, 12%;

A high-boiling aromatic petroleum solvent, 15%;

Isopropyl alcohol, 5%.

The above proportions are all weight percents.

Having thus described my invention what I claim as new and desire to secure by Letters Patent, is:

1. A process for breaking petroleum emulsions of the water-in-oil type characterized by subjecting the emulsion to the action of a demulsifier including hydrophile synthetic products; said hydrophile synthetic products being xylene-soluble; furthermore, said hydrophile synthetic products being oxyalkylation derivatives obtained by reacting (a) polymerized pentaallylsucrose with (b) an alkylene oxide selected from the class consisting of propylene oxide alone and propylene oxide in combination with ethylene oxide, with the proviso that polymerized allylsucrose does not contribute more than 15% of the final weight of the oxyalkylation derivative based on the assumption of completeness of reaction and on an average statistical basis; and with the final proviso that the ultimate composition comes within approximately the trapezoidal area of points A, B, C, D, in the accompanying Figure 2 of the hereto attached drawing.

2. The process of claim 1 with the proviso that the amount of ethylene oxide used as a reactant is not over 10% of the final weight of the oxyalkylation derivative.

3. The process of claim 1 with the proviso that the amount of ethylene oxide used as a reactant is not over 10% of the final weight of the oxyalkylation derivative, and the weight of polymerized penta-allylsucrose is not over 7½% of the final weight of the oxyalkylation derivative.

4. The process of claim 1 with the proviso that the amount of ethylene oxide used as a reactant is not over 10% of the final weight of the oxyalkylation derivative, and the weight of polymerized pentaallylsucrose is not over 7½% of the final weight of the oxyalkylation derivative and that any ethylene oxide employed as a reactant be used last.

5. The process of claim 1 with the proviso that the amount of ethylene oxide used as a reactant is not over 10% of the final weight of the oxyalkylation derivative, and the weight of polymerized pentaallylsucrose is not over 7½% of the final weight of the oxyalkylation derivative, and that any ethylene oxide employed as a reactant be used last; with the final proviso that the pentaallylsucrose be polymerized to the stage where it shows stringiness when diluted with an equal weight of xylene.

6. The process of claim 1 with the proviso that any ethylene oxide employed as a reactant be used last, and that the polymerized pentaallylsucrose be polymerized to the stage where it shows stringiness when diluted with an equal weight of xylene, and with the final proviso that the composition in terms of the initial reactants correspond to 4.5% by weight of polymerized pentaallylsucrose, 94% by weight of propylene oxide, and 1.5% by weight of ethylene oxide.

7. The process of claim 1 with the proviso that any ethylene oxide employed as a reactant be used last, and that the polymerized pentaallylsucrose be polymerized to the stage where it shows stringiness when diluted with an equal weight of xylene, and with the final proviso that the composition in terms of the initial reactants correspond to 6.5% by weight of polymerized pentaallylsucrose, 92% by weight of propylene oxide, and 1.5% by weight of ethylene oxide.

8. The process of claim 1 with the proviso that any ethylene oxide employed as a reactant be used last, and that the polymerized pentaallylsucrose be polymerized to the stage where it shows stringiness when diluted with an equal weight of xylene, and with the final proviso that the composition in terms of the initial reactants correspond to 7.5% by weight of polymerized pentaallylsucrose, 91% by weight of propylene oxide, and 1.5% by weight of ethylene oxide.

9. The process of claim 1 with the proviso that the polymerized pentaallylsucrose be polymerized to the state where it shows stringiness when diluted with an equal weight of xylene and with the final proviso that the composition in terms of the initial reactants correspond to 13% polymerized pentaallylsucrose and 87% propylene oxide.

10. The process of claim 1 with the proviso that the polymerized pentaallylsucrose be polymerized to the state where it shows stringiness when diluted with an equal weight of xylene and with the final proviso that the composition in terms of the initial reactants correspond to 8% polymerized pentaallylsucrose and 92% propylene oxide.

MELVIN DE GROOTE.

REFERENCES CITED

The following references are of record in the file of this patent:

UNITED STATES PATENTS

| Number | Name | Date |
| --- | --- | --- |
| 2,307,058 | Moeller | Jan. 5, 1943 |
| 2,454,541 | Dock et al. | Nov. 23, 1948 |
| 2,499,365 | De Groote et al. | Mar. 7, 1950 |